Sept. 16, 1952  J. P. BUTTERFIELD  2,610,615
ENGINE
Filed March 24, 1948  5 Sheets-Sheet 1

INVENTOR
John P. Butterfield.
BY
Harness & Harris
ATTORNEYS.

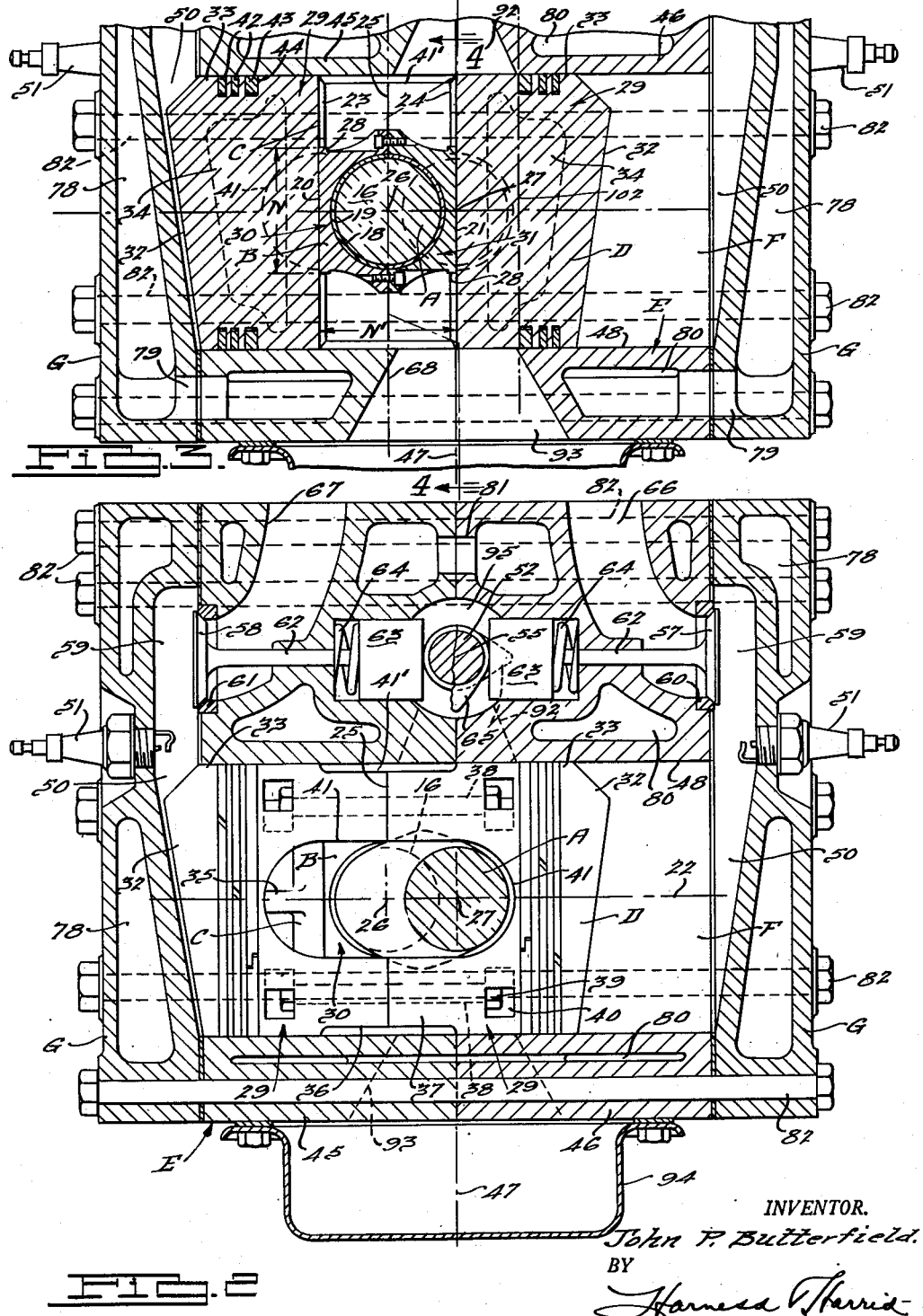

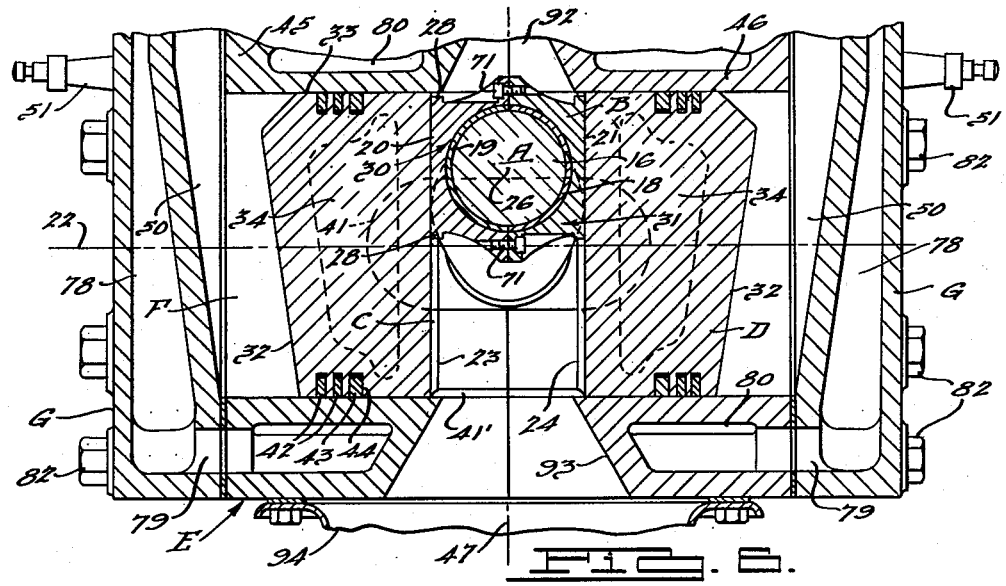
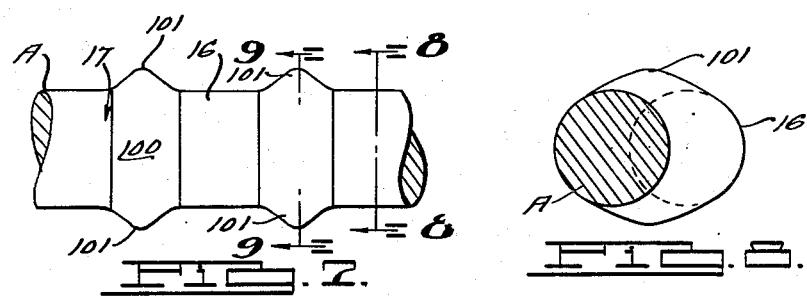
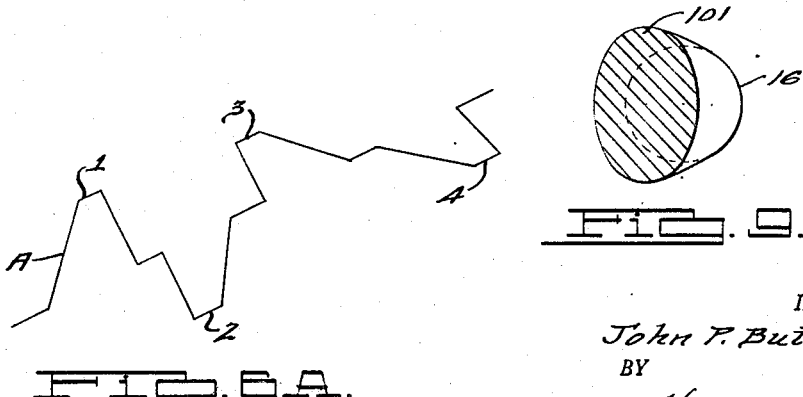

Sept. 16, 1952 J. P. BUTTERFIELD 2,610,615
ENGINE
Filed March 24, 1948 5 Sheets-Sheet 5
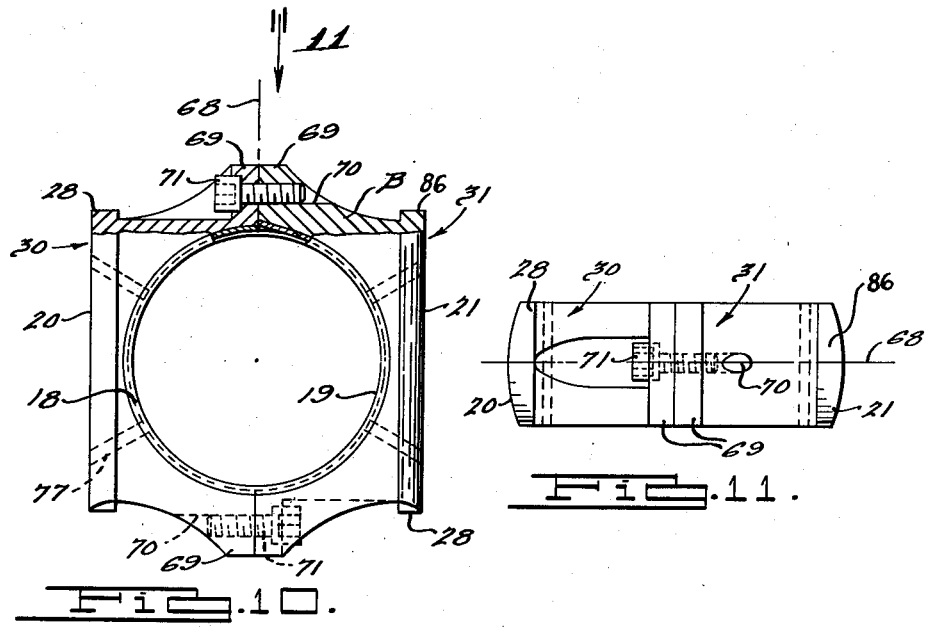
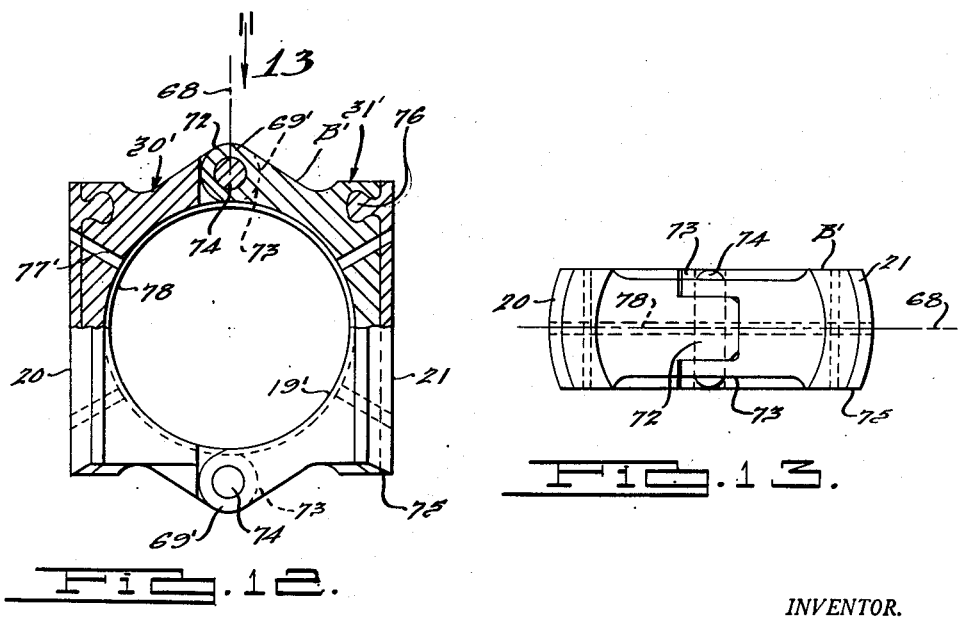
INVENTOR.
John P. Butterfield
BY
ATTORNEYS.

Patented Sept. 16, 1952

2,610,615

UNITED STATES PATENT OFFICE 2,610,615

ENGINE

John P. Butterfield, Grosse Pointe Woods, Mich., assignor to Chrysler Corporation, Highland Park, Mich., a corporation of Delaware Application March 24, 1948, Serial No. 16,645

1 Claim. (Cl. 123—56)

This invention relates primarily to internal combustion engines of the double acting type.

In the double acting type of engine a double ended piston is employed for reciprocatory movement in a working cylinder, such engines being arranged to provide a combustion chamber at each end of each cylinder for cooperation with one end of the double ended piston. Engines of this general type are known in the art and employ a crankshaft which is directly operably connected to the double ended piston without the use of a connecting rod of the more conventional type of engine.

It is an object of my invention to provide an engine having improved compactness for a given output whereby in comparison with known engines of equivalent output, an engine constructed in accordance with my invention occupies considerably less space. Such an engine is desirable for many uses, as, for example, for driving motor vehicles wherein space saving, along with weight and cost reduction are constantly striven for.

Another object is to provide an engine of improved simplicity of parts especially in connection with a double acting type of engine.

A further object of my invention is to provide an improved double acting engine having its parts so arranged as to provide improved mechanical relationships of the parts and at the same time minimize the overall dimensions of the engine for an engine of a given displacement.

Further objects of my invention in its more limited aspects are to provide a double acting engine of improved compactness in which, notwithstanding the necessity for the crankshaft to extend through the double ended piston, such crankshaft is of the unitary or one-piece forged type; the piston rings do not overtravel the slots or openings in the cylinder, such openings being provided to accommodate the crankshaft bearings or swing of the bearing block structure; the double ended piston is of uniform diameter as is the cylinder in which the piston slides; the piston intermediate body structure providing the ties between the piston ends lies within the cylinder bore; and the crank as well as at least those portions of the bearing block which are disposed immediately adjacent the piston slideway are so arranged as to at all times lie within the cylinder bore although intermediate portions of the bearing block may swing outside the cylinder bore while still preserving the benefits of compactness. In addition, in order that the optimum of compactness and engine output be obtained, I preferably locate the innermost piston ring of each piston head of the double ended piston as closely as practicable to the oblique portions of the unitary crankshaft and to the cylinder block openings for the crankshaft bearings and the intermediate portions of the bearing block when such piston head is in the extreme limit of its stroking movement inwardly.

In carrying out my invention, I have provided, as a further object of my invention, a double acting engine of relatively large bore stroke ratio which is most desirable for compactness while at the same time realizing all the other objects of my invention including the incorporation of a unitary crankshaft. Heretofore, in engines of this type, it has been deemed necessary to provide a relatively small bore stroke ratio at a sacrifice of compactness or to incorporate structural arrangements such as a built-up or sectional crankshaft at a sacrifice of other desirable characteristics. This is especially so in connection with engines dealing with conventional high gas explosion pressures and while my invention is primarily directed to such engines it may also be of advantage in other machines utilizing unusually high pressure operation in the order of engine pressures rather than ordinary pressures usually dealt with in compressors, for example. However, generally speaking, compressor problems are quite different from engine problems and many arrangements acceptable for compressors would result in failure if employed in modern engine structures or in other high pressure machines.

Another object is to provide an improved engine of the aforesaid type incorporating a solid or one-piece crankshaft in conjunction with a novel arrangement of engine assembly embodying a built-up piston structure and built-up bearing block structure. In the copending application of Alexander G. Herreshoff, Serial No. 16,801, filed March 24, 1948, certain of the broad principles and novel features incorporated in my disclosure are more particularly described and claimed. However, in said Herreshoff application there is incorporated a multi-sectioned or built-up crankshaft to facilitate assembly of the engine. My invention permits the use of the stronger and generally more desirable unitary crankshaft while, at the same time, incorporating novel features of construction whereby the engine may be readily assembled and whereby the essential desirable features of said Herreshoff application may be retained in my invention.

An additional object of my invention is to provide an improved bearing block structure capable of ready assembly with a crankshaft of the unitary type.

Another object is to provide a double acting engine arranged for improved installation in a motor vehicle by reason of a novel construction and disposition of the cylinder block, camshaft, pistons, and oil reservoir.

An additional object is to provide an improved and simplified assembly of engine block, crankshaft, piston, and bearing block components.

Yet another object is to provide an improved lubricant drainage from the valve chamber, above the pistons, to the oil reservoir below the pistons by utilizing the cylinder openings which accommodate the travel of the bearing block.

Further objects and advantages of my invention reside in the novel combination and arrangement of parts, more particularly hereinafter set forth, reference being made to the accompanying drawings in which:

Fig. 2 is a transverse sectional elevational view through a typical cylinder of the Fig. 1 engine;

Fig. 3 is a sectional view of the left hand piston and slidehead or bearing block in their Fig. 1 positions, the view being taken as indicated by section line 3—3 of Fig. 1;

Figure 1:
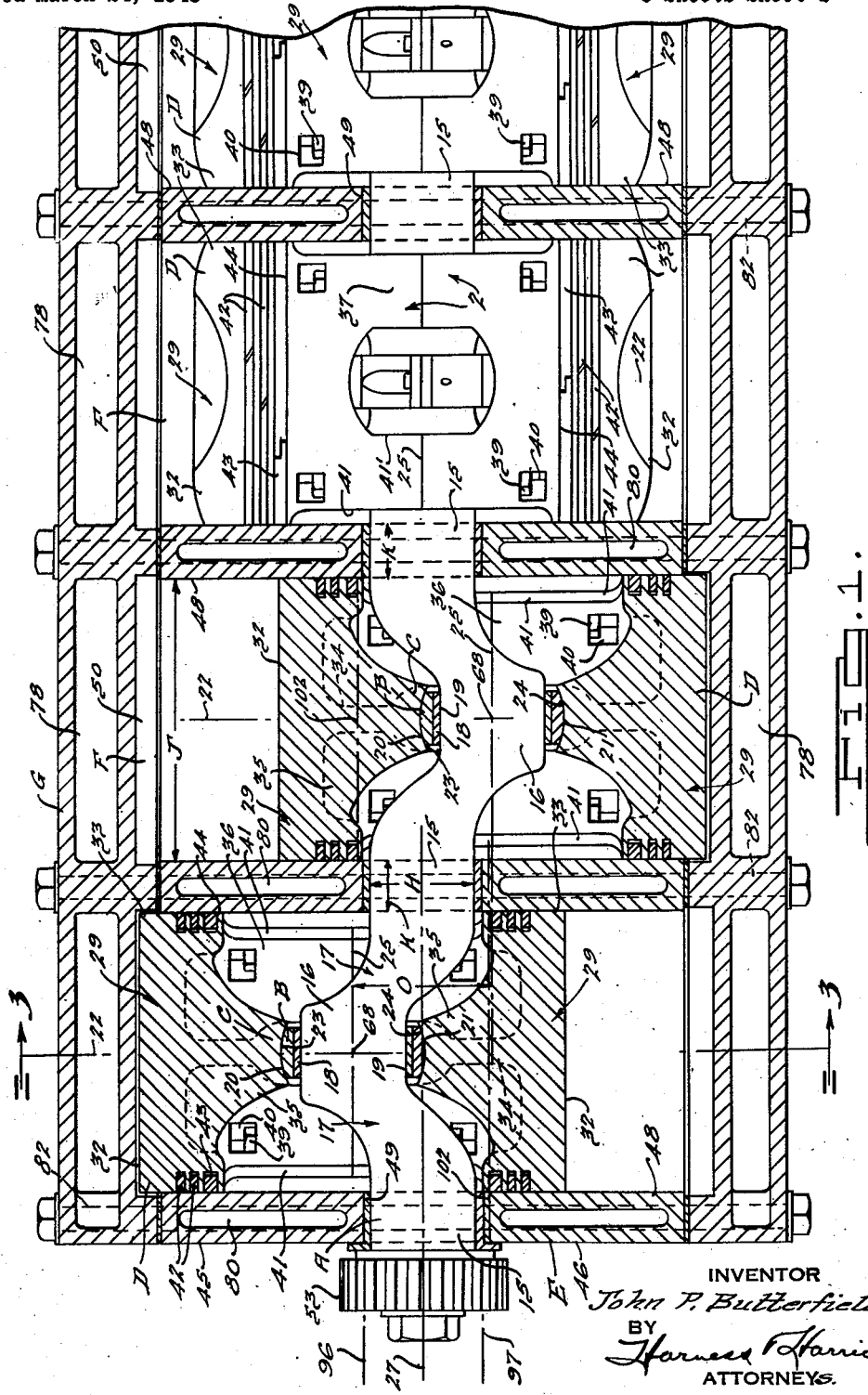
Fig. 1 is a longitudinal sectional plan view through a portion of the engine.
Figure 4:
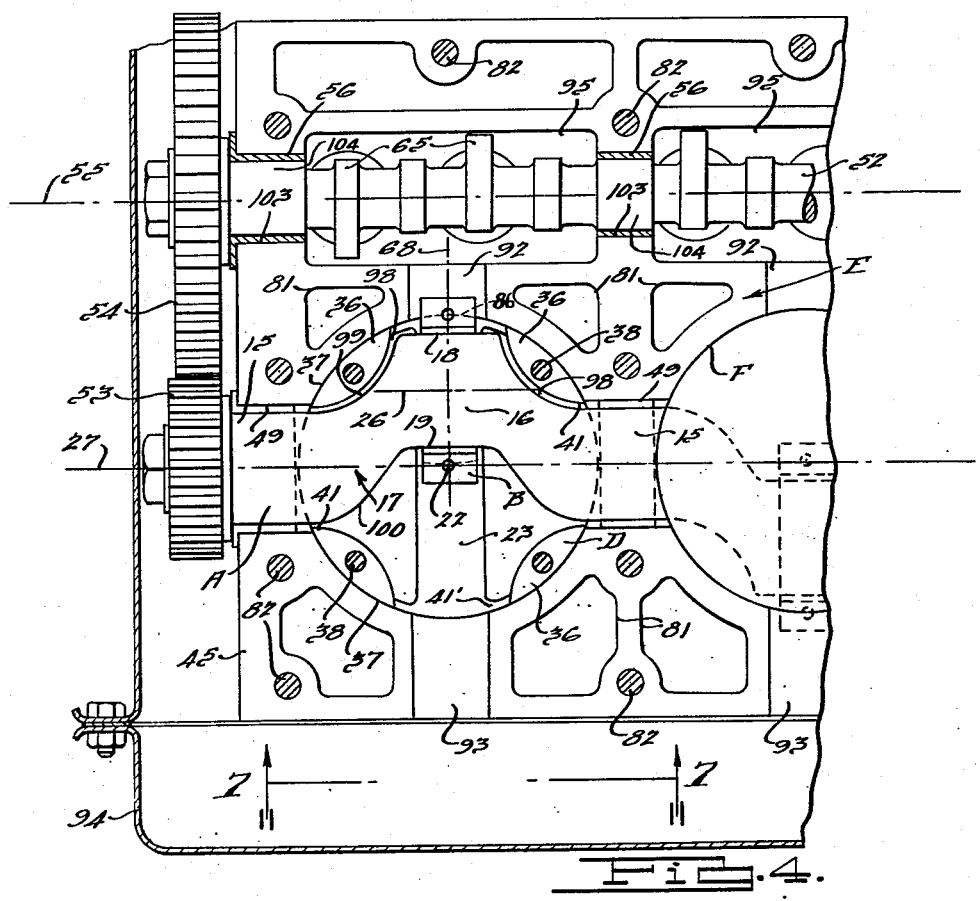
Figure 5:
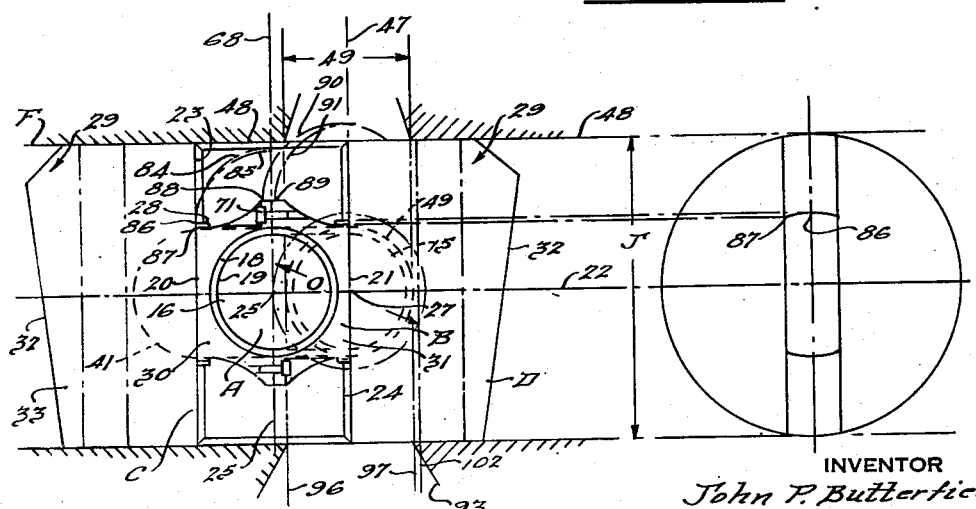

Fig. 4 is a transverse sectional view taken along line 4—4 of Fig. 3 but showing the bearing block of the piston at the left end of Fig. 1 in one of its extreme positions of movement laterally 90° from the position of Figs. 1 and 3, portions of the camshaft being also shown;

Fig. 5 is a diagrammatic view illustrating the motion of the bearing block relative to the piston;

Fig. 6 is a view similar to Fig. 3 but showing the piston in its mid-stroke position;

Fig. 6A is a diagrammatic perspective view of the crankshaft;

Fig. 7 is an elevational view of a typical crank portion of the crankshaft as viewed according to line 7—7 of Fig. 4;

Fig. 8 is a sectional view taken on line 8—8 of Fig. 7;

Fig. 9 is a sectional view taken on line 9—9 of Fig. 7;

Fig. 10 is an enlarged elevational view of the bearing block structure as seen in Fig. 3, parts being broken away;

Fig. 11 is an end elevational view according to the arrow 11 of Fig. 10;

Fig. 12 is a view similar to Fig. 10 but illustrating a modified bearing block structure;

Fig. 13 is an end elevational view according to the arrow 13 of Fig. 12.

In the drawings, reference character A represents the engine crankshaft structure which is formed as a solid, unitary, or one-piece steel forging. This crankshaft structure has a plurality of central axial bearing portions 15 and the off-set crank portions 16. The number of cranks 16 depends on the number of cylinders of the engine, there being one crank for association with each cylinder. Each crank is joined with a pair of adjacent bearing portions 15 by obliquely extending crankshaft portions 17.

Each of the cranks 16 is embraced by a slide head structure or bearing block structure B which has a split cylindrical bearing insert 18 having an internal cylindrical bearing surface 19 having a bearing fit with a crank 16 and a pair of diametrically disposed bearing surfaces 20, 21 having a sliding fit in the slideway C of a double ended piston D. This slideway extends transversely of the common piston and cylinder axis 22 and the elements of the slideway bearing surfaces 23, 24 engaged by surfaces 20, 21 extend parallel with a plane 25 which contains the axis 26 of the crank 16 and which is perpendicular with the piston axis 22, the same being also true of the elements of surfaces 20, 21. The slideway C is thus disposed perpendicular to a plane containing the piston axis 22 and the axis 27 of the bearing portions 15 of the crankshaft structure A. The slideway C and bearing block B are important in that they provide sufficient area to take the high thrusts under sliding action without developing undue wear and rattle. The bearing block B, as will be presently more apparent, presents several critical regions such as at its corners or regions 28 which lie immediately adjacent the opposite extremities of the surfaces 20 and 21 in a direction transversely of the piston axis 22, as viewed in Fig. 3.

In order to facilitate assembly of each piston structure D and bearing block structure B with each of the cranks 16 of the one-piece crankshaft structure A, I have formed the piston of a pair of mating or complementary similar half-portions 29 which are adapted to be bolted together to provide a rigid double ended piston. Likewise the bearing block structure is formed of similar or interchangeable complementary half portions 30, 31.

Each piston portion 29 comprises a pressure-receiving head 32 formed with a skirt 33 depending therefrom and such piston portion is provided with an X-brace connection between its head, skirt, and slideway portion in the form of a pair of cast struts or webs 34 and 35. This X-brace serves to rigidly and integrally join one of the slideway bearing surfaces 23, 24 with an associated piston head 32 and skirt portion 33. Each piston portion 29 is further provided with an intermediate body portion joined to that of the other piston portion 29. This intermediate body portion in the present illustrated embodiment of my invention comprises a plurality of circumferentially spaced piers or ties 36 extending from each skirt portion 33. The piers of one piston portion 29 have their end faces engaged with corresponding faces of the piers of the other piston portion, the engagement being in plane 25.

The piers 36 have their outer surfaces 37 cylindrically formed to slidably fit the associated cylinder bore and abutting pairs of piers are provided with a passage extending axially of the piston for receiving a tie-bolt 38 tensioned by the heads 39, access to which is accommodated by the head-receiving piston windows 40. It will be apparent that the piston structure D as a whole is uniformly cylindrical throughout its length, no portion of the piston projecting radially beyond the skirt and pier outer bearing surfaces.

The intermediate body structure of each piston structure D is provided with a pair of diametrically disposed piston slots or openings 41 extending axially of the piston, these openings being provided between the piers 36 which are adjacent the crankshaft bearing portions 15. The slots 41 receive the crankshaft A and are so arranged as to provide unobstructed reciprocation of the piston and are of minimum length such that when the piston is at its extreme limits of reciprocatory travel the respective ends of the slots 41 are disposed with minimum practicable clearance with the crankshaft structure in order to attain the maximum compactness for the engine.

The spaces between adjacent piers 36 on the same side of crankshaft A define openings 41' for the slideway C which extends all the way through the piston structure D.

Each of the skirt portions 33 is formed with a plurality of ring-receiving grooves opening outwardly toward the cylinder bore for accommodating the desired number of outwardly expanding compression rings, oil rings, and the like indicated at 42, the innermost ring being designated at 43, the location of the latter being of material significance in the more limited aspects of my invention, as will be presently more apparent. Each ring is provided with a support land, that for the innermost ring being indicated at 44.

The engine cylinder block structure E, according to my invention, is shown disposed such that the cylinders extend horizontally as shown in Fig. 2, but in the broader aspects of my invention the axes of the pistons may extend vertically or the engine turned at any other desired angle in which event the oil reservoir and certain accessories may require re-orientation as will be readily understood. It will be understood that terms of reference to the horizontal and vertical are employed only for convenience except as may be expressly otherwise set forth in the appended claims. Furthermore, my description will for the most part be directed to a cylinder and piston assembly which is typical of the remaining cylinders and pistons of the engine.

The block E is formed in mating component half-portions 45, 46 having planar face contact vertically at plane 47 which passes through the axis 27 of crankshaft structure A. The component portions 45, 46 are formed with companion cylinder bore portions 48 so that when the block portions are brought together each piston D will be slidably contained in what in effect is a single continuous uniform diameter cylinder F open at each side of the block and made up of the two coaxial cylinder bore portions 48, as shown in Fig. 2. The cylinder block portions are formed with pairs of mating or companion openings or recesses for receiving the bearing portions 15 of the crankshaft structure, as will presently be more apparent. Thus the cylinder block portions together provide the openings 49 for rotatably receiving the crankshaft structure. The cylinders F are closed at each end thereof by a cylinder head G seated at the side of the portions 45, 46 of block E, each cylinder head having a plurality of combustion chambers 50 for the multi-cylinder engine illustrated. Each combustion chamber closes one end of a cylinder F and is provided with the usual spark plug 51 where the engine is of the conventional spark ignition type.

The engine illustrated is of the four-stroke cycle type having a camshaft structure 52 extending longitudinally of the engine and driven from one end of the crankshaft by gears 53, 54 in Fig. 4. The camshaft has its axis 55 in the plane 47 and is journalled in bearings 56 located at intervals above the crankshaft bearing portions 15 and in suitable mating or companion openings or recesses in the portions 45, 46 of block E. The camshaft operates intake and exhaust valves 57 and 58 respectively, it being understood that each combustion chamber 50 has an upwardly extending valve-receiving portion 59 accommodating the lift of a set of valves 57, 58 for controlling the fuel mixture intake to the chamber 50 and the discharge of exhaust gases therefrom as is well known for four stroke cycle engines in general. Each of the component cylinder block portions is provided with intake and exhaust valve seats 60 and 61 engaged by the respective valves 57 and 58.

The valves 57, 58 have their stems 62 extending toward camshaft 52 for operation by cam followers or tappets 63, a spring 64 yieldingly seating each valve and maintaining the tappets in contact with the various cams 65 of the camshaft 52. The block portions 45, 46 are provided with intake and exhaust passageways 66, 67 extending from the seats 60 and 61 of the respective intake and exhaust valves 57, 58 upwardly so as to open at the upper faces of block portions 45, 46 for communication with conventional intake and exhaust manifolds (not shown).

As each piston structure D reciprocates in its cylinder F, the bearing block B slides back and forth in the slideway C while transferring the reciprocatory movement of the piston structure into rotation of the crankshaft structure A by reason of the crank portion 16 being journalled in the bearing 18. In order to allow for self-adjustment of these operating parts and to compensate for any minor misalignments in the assembly as well as to improve the efficiency and general operating characteristics of the piston and crankshaft connection, each pair of sliding bearing surfaces 20, 23 and 21, 24 are formed as portions of cylindrical surfaces having a common axis 68 as the axis of such cylinders. This axis 68 is contained in plane 25 and is normal to axes 22 and 26. When the piston structure D is at each of its extreme positions of movement outwardly of its cylinder then the three axes 22, 26, and 68 intersect at a common point as seen in Fig. 5 for example. The bearing block structure B is not confined to small amounts of movement axially on crank 16 in the direction of the crank axis 26 and, therefore, the cylindrical bearing surfaces 20, 23, and 21, 24 will act to center the bearing block structure B on the crank 16. The bearing block structure B is free to adjust itself between the piston and crankshaft structures to relieve binding which might otherwise result from minor inaccuracies of machining and assembling of the parts.

The bearing structure B is formed, for convenience of assembly, of a pair of similar interchangeable portions 30, 31 provided internally with the complementary semi-cylindrical portions of the aforesaid cylindrical bearing surface of revolution 19 surrounding the cylindrical bearing surface of crank 16 and having a journal bearing fit therewith. Bearing surface 19 is developed or generated about the axis 26 of the bearing surface of the crank 16.

Each of the bearing block portions 30, 31 is provided with a connecting portion 69 at opposite sides of and adjacent its semi-cylindrical portion of bearing 19 and each portion 69 is perforated at 70 on an axis parallel with the axis 22 of the piston structure D. The connecting portions 69 constitute portions or regions intermediate the corner regions 28 in a direction axially of the piston structure. When the bearing block portions 30, 31 are assembled the perforations 70 of the connecting portions 69 are in alignment with each other at the opposite sides of bearing 19 to receive the headed connecting members 71 which maintain portions 30, 31 assembled with their portions 69 in contact with each other in a plane normal to axis 22 and containing axis 68.

In the modified form of bearing block structure B' illustrated in Figs. 12 and 13, the similar and interchangeable block portions 30' and 31' have their connecting or intermediate body portions 69' disposed as aforesaid for portions 69 but differing therefrom in that the connecting portions 69' are of hinge-like formation. Thus each portion 69' has a centrally disposed hinge projection 72 at one side and a pair of axially spaced apart hinge projections 73 at its opposite side, the projections 72 and 73 being perforated at 70'. On assembly a connecting member or pin 74 is passed through the aligned perforations of a projection 72 and a pair of projections 73 thereby forming the bearing structure B' as a rigid unit, projection 72 fitting into the space between projections 73 and the axes of pins 74 extending parallel with the axis 22 of the piston structure D. Otherwise, the block B' is similar in structure and function to the block B in that it is provided with the aforesaid cylindrical bearing surfaces 20 and 21. It will be understood that the bearing structures B and B' are illustrative alternatives for use in the connecting means between the piston structure D and crankshaft A.

As illustrative of practicable examples of materials forming the parts of the operative connecting means and not by way of limitation, I have obtained good results by casting the piston structure D of commercial aluminum alloy ordinarily used to cast pistons in general, the bearing block structure B being made of steel and having its cylindrical bearing surfaces 20, 21 hardened. The steel crankshaft A has hardened cranks 16 running in semicylindrical bearing inserts 18 of appropriate bearing alloy such as commercial copper, lead, and steel employed in conventional engines for connecting rod and crankshaft main bearings. If desired, the piston structure D may also be of cast iron instead of aluminum.

In connection with bearing block B', I have illustrated a modification which, if desired, may be employed in connection with block B. In the block B' the cylindrical bearing surfaces 20, 21 are carried by and formed as a part of a cast iron insert or facing shoe 75 which is secured to each bearing block portion 30', 31'. The shoes 75 are placed in a mold and the aluminum alloy is then poured to form the aluminum block portions 30', 31'. The shoes 75 have enlarged anchors 76 embedded in the portions 30', 31' during the casting operation of these portions to provide a unitary assembly of each portion and its bearing shoe 75. As an example of use with such an arrangement the piston structure D may be formed of aluminum as aforesaid, the aluminum portions 30', 31' having their bearing surfaces 19' journalling the hardened steel cranks 16.

While I have not illustrated the pressure lubricating system for the engine, I have shown in Figs. 10 and 11 one manner of conducting lubricant from crank pin 16 to slideway C, the bearing block portions 30, 31 having the lubricant passages 77. In Figs. 12 and 13 corresponding passages 77' are supplied from an annular lubricant collecting groove 78. Further details are more particularly set forth in my copending application Serial No. 16,648, filed March 24, 1945.

For an engine of the liquid-cooled type, the cylinder heads G have cored chambers 78 (Figs. 3, 6) for the circulation of a coolant, these chambers opening at 79 to the cored chambers 80 of the block portions 45, 46 for surrounding the cylinders F with the coolant. The chambers 80 are open to each other for circulation of the coolant at 81.

In order to prevent leakage of the coolant at the plane 47 where the block portions 45, 46 are brought together in face contact, these face portions are preferably lapped and coated prior to assembly with a commercial rubber cement or other suitable sealing medium which will permit the block portions to be accurately fitted together to preserve the desired relationship in the component portions of the engine elements as, for example, the cylinders and the bearings for the crankshaft and camshaft.

The portions 45, 46 of the block E are held together in assembled relationship, along with the cylinder heads G, crankshaft A, and camshaft 52, by a plurality of tie-bolts 82 which extend laterally all the way through the component cylinder block portions and the cylinder heads G, the opposite headed ends of the tie-bolts being seated on suitable faces provided by the outer sides of the longitudinally extending cylinder heads G.

In carrying out my invention, I have provided certain physical relationships of the various parts in order to obtain maximum compactness of the engine which is of the greatest practicable importance, especially in enabling the engine to be constructed with a unitary crankshaft structure as contrasted with a sectional or built-up crankshaft structure. In automotive, aircraft, or even stationary power plant installations, engineers have striven to provide an engine which will produce more power for a given physical size, the latter also necessarily including weight and cost, such compactness being most difficult to achieve in a double acting engine having a soiled crankshaft. In automotive installations such compactness in engine constructions is of the greatest importance in providing a minimum of space for the power plant and a maximum of space for the passenger or load compartment as well as a maximum of space for wheel suspensions, steering mechanism, and other vehicle equipment. This, of course, means that if such vehicle is powered commensurate with standard practice my engine would occupy much less space and would be much lighter and less costly to manufacture and, at the same time, incorporate the preferred type of unitary crankshaft.

There are certain critical relationships of certain of the parts of a double acting engine, these being interdependent on each other so that if they are brought together according to my teachings then the desired compactness will result. On the other hand, if certain of the component relationships are not observed, then this in turn requires such distortion of other of the inherent relationships that the advantages of my invention cannot be realized, at least not to the extent possible by such observance.

In an engine having conventional carburetor type of aspiration, pressures in the combustion chamber are developed, with fuels of the most common octane rating, in the order of 600 p. s. i. (pounds per square inch) although with supercharging and for high octane fuels or for diesel engine practice pressures of 1200 p. s. i. and even more are utilized. In constructing a double acting engine, it is important that the diameter H of the crankshaft bearings 15 should be a minimum consistent with allowable stress and bearing loads. For engines of the conventional carburetor aspirator type, by utilizing available commercial forged material for the unitary crankshaft structure A, the ratio of the cylinder bore J to H should be in excess of approximately 2.4, say 2.4 to 2.6. If the ratio is materially higher, then excessive deflection and loads are placed on the crankshaft leading to failures at bearings 15 and at the bearing block B, for example. If this ratio is materially lower, then H is too large in relation to J from a standpoint of necessary strength and, of more importance, such relationship exacts a magnified penalty on the ultimate size, weight, and cost of the engine for a given power output. The general relationship of J in terms of H is as follows:

$$\left(\frac{J}{H}\right)^3 + \left(\frac{J}{H}\right)^2 \left(\frac{K}{H}\right) - \frac{L}{2M} = 0$$

where K is the length of the bearing 15, L is the total allowable stress, and M is the applied pressure on the piston. For good practice, I have illustrated the bearings 15 as being of a length K equal to half their diameter. As the allowable stress of the material is about 20,000 p. s. i. it will be found that the ratio of J to H is 2.4. In time other materials may be discovered which will permit this ratio of approximately 2.5 to be increased which will be of advantage in following the teachings of my invention and in my reference herein to specific values of such ratio, I naturally contemplate such deviations therefrom as may be made possible by the utilizing of materials for the crankshaft which may be suitable as well as deviations occasioned by the use of combustion pressures higher than the assumed conventional pressure of around 600 p. s. i. However, for modern practice as a substitute for present popular automotive engines the ratio of approximately 2.5 is chosen as being determinative of achieving the improvements set forth herein for purposes of illustrating my invention. The desired relationships are most difficult to achieve without resorting to a sectional crankshaft, my invention making it possible to obtain the desired compactness and to assemble the engine with a unitary crankshaft structure A.

With the values of J and H having been determined, the proper stroke of the engine is also determined thereby as will be presently apparent and is not to be taken as any arbitrary value according to the broader aspects of my invention. I determine the maximum proper engine stroke for the maximum of compactness as that value which will cause the bearing block B to travel in a path such that the continuity of the cylinder F will not be interrupted outwardly of the crankshaft axis 27 at a distance greater than the interruption necessarily required for accommodating the crankshaft A whereby the innermost piston ring 43 will not travel over any such interruption in the cylinder wall. As it is generaly desirable to provide the crankpin 16 with a diameter equal to H, and as the bearing block B surrounds the crankpin, it will be apparent that the sweep of the corner regions 22 of block B presents critical limitations to the maximum proper engine stroke. The difficulty is further increased by reason of the requirement to split the bearing block B and to provide a fastening means for the block halves and to so arrange the intermediate regions of the block B so that during its swing such regions will not cut the cylinder walls more than the length of cut or opening 49 required to receive the crankshaft structure A as otherwise, if rings 43 are to avoid contact with such cuts, the pistons must be longer and the width and weight of the engine increased.

The minimum length N as well as the width N' of the bearing block C as seen in Fig. 3 should be, from the standpoint of practical considerations, approximately 1.25 times that of the crankpin diameter H. By proportioning the ratio of the bore J to the stroke O substantially 2 to 1, while providing adequate ties 36 for the opposite piston heads 32, then the travel of the advancing corner region 28 will describe an arcuate path 84 which, as seen in Fig. 5, will at all times lie within the cylinder bore.

In order to provide a maximum of stroke O for a given bore J, and at the same time provide the desired size of bearing block B and crankpin 16 and to also maintain the piston rings 42, 43 in contact with uninterrupted portions of the walls of cylinder F at all times during operation of the engine, I utilize the length of cylinder walls defined by the crankshaft-receiving openings 49 to accommodate further openings 92, 93 to receive intermediate portions of the bearing block B during movement of the piston structure D toward and from its mid-stroke positions, which openings are shown in Fig. 6. In the diagram showing of Fig. 5 the block opening 49 is projected 90° around the cylinder wall into the path of swing of the bearing block B to illustrate the optimum relationship. In Fig. 5 I have illustrated the paths of swing of several points on the bearing block B and particularly those points which are most critical in tending to cut the cylinder walls the most distance away, in a direction axially of the cylinder, from the mid-region of the cylinder at the plane 47. As will presently be more apparent, no point on the bearing block B cuts the cylinder walls outside of the projected length 49. Therefore, if the piston rings are arranged to clear the openings 49 then they will not overlap the openings necessary to accommodate the swinging movement of the bearing block B and at the same time fasteners 71 for block B are provided and a solid crankshaft is employed. The most critical region of block B in connection with the path of travel aforesaid tends to be located at the corner regions 28 and also at the intermediate regions 69. By insuring the travel of regions 28 always within the cylinder bore it is then possible to so arrange the parts that all points on the bearing block B intersect the cylinder walls in the region located within the diameter of the crankshaft-receiving openings 49. This represents the optimum relationship for compactness where the piston rings do not overtravel any cylinder openings.

In Fig. 5, the regions 28 are preferably curved at 86 in the direction of the thickness of block B concentrically with the cylinder so that they may swing closely to the cylinder with substantially minimum clearance and without breaking into the cylinder and thereby not penalizing the maximum available stroke. Such clearance can, as a practical matter, be maintained as little as .025 times the diameter of the crank portion 16 and even less for carefully machined parts and careful assembly.

The travel of the extreme curved element of an advancing region 28 is illustrated by circular paths 84 and 85 for the respective points 86 and 87 on such element. It will be noted that these arcs do not cut the cylinder. In similar manner the travel of two critical points 88, 89 lying at the intermediate region 69 is shown by circular paths 90, 91 respectively which cut the cylinder, the latter being provided with upper and lower openings or slots 92 and 93 respectively to accommodate the swing of the intermediate regions 69 of bearing block B. The openings 92 and 93 are formed by complementary or mating half-portions in the contacting faces of the cylinder block portions 45, 46. It will be noted that the length of the openings 92, 93 in the direction of the cylinder and piston axis 22 does not exceed that of the cylinder block openings 49 for the crankshaft A such that the innermost piston ring 43 does not overtravel such openings.

The coolant in the cylinder block sections 45, 46 circulates around the openings 92, 93 and the lower opening 93 is utilized for oil drainage as it is open downwardly through the cylinder block portions to drain oil from the region inside the hollow piston structure D downwardly into the reservoir or oil pan 94 which is attached to the under face of the cylinder block structure E to provide the lubricant sump for the engine. It will be noted that during operation of the piston the openings 92, 93 are at all times open to the interior of the piston structure D and that the piston rings 42, 43 always seal the combustion chamber 50 from communication with openings 92, 93. The upper opening 92 at each cylinder F, as best seen in Fig. 4, places one of the camshaft chambers 95 in communication with the interior of a piston structure D for oil drainage from chamber 95 down through the piston and opening 93 to the pan 94. Each camshaft chamber 95 is defined by mating recesses in the block halves 45, 46 and lies between adjacent camshaft bearings 56 to receive therewithin the four cams 65 for controlling the intake and exhaust valves 57, 58 adjacent each end of the cylinder which is directly below such camshaft chamber.

The offset of the crank portion 16 is of such amount in relationship with the cylinder bore J, and the bearing block structure B and slideway C are so constructed and arranged, that the regions 28, as well as all other points on the bearing block bearing surfaces 20, 21, always lie within the bore of cylinder F during operation of the engine. The regions 28 and such other points on the bearing block bearing surfaces 20, 21 are always disposed outwardly axially of the bore from parallel planes 96 and 97 (Figs. 1 and 5). These planes are perpendicular to the cylinder axis 22 and are tangent with the crankshaft-receiving openings 49. By maintaining such relationship, the corner regions 28 and all other points on the bearing block bearing surfaces 20, 21 will move in such a path that will not require interrupting the cylinder bore axially outwardly from the interruption at 49 necessary to receive the crankshaft structure. Therefore, if the piston rings clear to openings 49 then they may be disposed to move close to these openings and yet always slide on uninterrupted portions of the cylinder bore even though, at times, the critical corner regions 28 of the bearing block structure C and other points thereon lie outside of the parallel planes 96 and 97.

It will be noted that the offset of the crank portion 16, which determines the stroke O, is of such predetermined amount in relationship with the diameter J of the cylinder bore F that, during operation of the engine, each of the oblique portions 17 of the crankshaft structure A will sweep a path adjacent the intermediate body structure of piston D such that, when the piston is midway of its stroke as shown in Fig. 4, such oblique portion will be disposed in a direction transversely of the piston axis 22 with substantially minimum clearance 98 with respect to a piston tie-portion or intermediate piston body structure 36 which lies between a piston opening 41 and one end of the slideway C and which is disposed at such time adjacent a plane perpendicular to the piston axis 22 containing the axis 27 of the crankshaft structure. My reference to minimum clearance will be readily understood as meaning the usual practical nominal minimum clearance for accommodating necessary shop tolerance operations. In production it is usually desirable to assemble crankshafts as forged and without machining except for the bearing and crank journals.

Where such a forged crankshaft structure is employed, without machining the outer surfaces of the oblique portions 17, and where the piston D is not machined as to these portions adjacent the region of minimum clearance at 98, this minimum clearance should be about one-eighth of an inch plus or minus usual shop tolerances in order to most fully realize the advantages of my invention. Of course, if the crankshaft or piston is machined at the region 98 then this minimum clearance may be somewhat lessened. The opposite head portions or portions 29 of the piston must, of course, be connected together sufficiently to maintain the desired rigidity of the piston to insure its proper operation and, therefore, adequate thickness of material must be imparted to the piston intermediate body structure 36. When this is effected, certain of the important objects of my invention may be realized by providing the oblique crankshaft portions 17 disposed to move with substantially minimum clearance with reference to the piston tie portions thus insuring the maximum piston stroke and the maximum compactness for the engine.

In addition to the foregoing, the provision of tie-bolts 38 for securing the piston portions 29 together makes it further necessary to provide adequate thickness of material around the embedded fasteners 38 so that adequate strength is imparted to the piston structure D. As best seen in Fig. 4, I have provided a novel relationship between the piston ties 36 and crankshaft which contributes in arriving at the desired optimum in compactness as set forth in detail herein. In Fig. 4 the piers 36, at least in the region of swing of the oblique portion 17, have their inner surfaces convex around the fasteners 38 and the oblique portions 17 are correspondingly dished or concaved at 99 bounding the minimum clearance region 98. In order to provide substantially uniform strength in the oblique portion 17, I have constructed such portion of substantially constant or uniform area in sections normal to the crankshaft axis 27 between the ends of portion 17 at a crank 16 and bearing 15. Figs. 7 to 9 illustrate the construction of a typical oblique portion 17. In order to prevent undue weakening of the portion 17 adjacent the crank portion 16 the surface region 100 which is disposed 180° from the concave region 99 is generously bulged outwardly as a concave surface and surface regions 90° from regions 99 and 100 are locally bulged or convexed at 101. These portions do not interfere with the piston ties 36 because when they face these ties the crank 16 is in the vicinity of the axis 22. The bulged portions 101 are diametrically opposite each other adjacent each end of crank 16 and lie adjacent the dished portions 99.

In connection with the piston rings 42, 43 it will be noted that they are so disposed, in relationship with the crankshaft-receiving openings 49, as to always remain in engagement with portions of the cylinder bore which are disposed outwardly of these openings in a direction axially of the bore during operation of the engine.

The innermost piston ring 43 of each piston D is disposed for movement contiguous to the associated crankshaft bearings 15 and contiguous to the cylinder block openings 49 for such bearings. By so locating these inner rings the length of the piston is kept to a minimum and, therefore, the width of the engine is minimized along with the optimum in compactness, low weight, and low cost. Furthermore, such ring location in a sense determines the maximum stroke of the piston as I deem it to be desirable to have the piston rings always engage the continuously cylindrical uninterrupted wall portions of the cylinder bore F to avoid danger of the rings expanding into cylinder openings with consequent damage to the rings, lands, cylinders, and leakage past the rings. Therefore, the rings should not overlap any cylinder openings at least to such an extent as to give rise to tendency of the rings to expand into any cylinder openings or to otherwise cause undesired wear of the cylinder and rings and jamming and breakage of these parts. My invention teaches how this is accomplished when a solid crankshaft is employed.

The innermost ring 43 associated with each piston head portion 32 has its inner surface boundary, axially of the piston, disposed in a ring-surface 102 which is normal to axis 22 and disposed as shown in Fig. 1 when such piston head portion is at the limit of its stroke inwardly of the cylinder bore. The stroke O is such in relationship with the cylinder bore size J and bearing block structure B and slideway C are so constructed and arranged that the corner regions 28 and all other points on the bearing surfaces 20, 21 of block structure B always lie within the cylinder bore during operation of the engine, the end regions 28 and the other points along the bearing surfaces 20, 21 being disposed outwardly axially of said bore from such planes 102.

The bearing block B is thus maintained of minimum length in the direction of slideway C, preferably such that the corner regions 28 remain within the cylinder walls at all times. Inasmuch as openings in the cylinder walls are necessary to journal the crankshaft and inasmuch as I have provided an arrangement which causes the piston rings to avoid overlapping such journal openings, certain of the advantages derived therefrom would be, at least to some extent, lost if the bearing block B was arranged for such movement as to require an opening in the cylinder wall into which the piston rings could expand with destructive results.

Certain of my engines arranged in accordance with my invention provide a bore stroke ratio $$\frac{J}{O} \text{ of } 2$$

as aforesaid, with the desired good results. Obviously some latitude in the ratios set forth herein may be taken, and I have cited specific quantitative examples by way of illustrating the basic principles of my invention and not by way of limitation as a matter of exact figures. Likewise such engines incorporate a ratio of bore to crankshaft bearing diameter $$\frac{J}{H} \text{ of } 2.5$$

and 2.6 and a ratio of stroke to crankshaft bearing diameter $$\frac{O}{H}$$

of approximately 1.25.

The relationship of $$\frac{O}{H}$$

is derived from $$\frac{J}{O}=2 \text{ and } \frac{J}{H}=2.5$$

from which $$\frac{O}{H}=1.25$$

thus further illustrating the desired relationship of stroke O in terms of crankshaft bearing diameter H dependent on a common relationship which each has with the bore J.

Any suitable crankshaft throw arrangement may be provided such as in Fig. 6A arrangement of cranks for the four cylinder engine illustrated. Cranks 1 and 2 are in the same plane but 180° from each other. Cranks 3 and 4 are likewise in a common plane and 180° apart. These two planes are related 90° from each other. This four cylinder engine is, in effect, an eight cylinder engine as each of the four cylinders hereinbefore discussed in detail provides two combustion chambers each having its piston head for operating the crankshaft. Obviously any number of cylinders may be used to construct an engine within the teachings of my invention.

The split cylinder block E and the split pistons D and blocks B facilitate the assembly of my engine on a solid crankshaft A. The bearing block B and pistons are assembled on the crank portions 16 as will be readily understood. Then the block sections 45, 46 are brought together to contain the various parts including the valve gear shown in Fig. 2 and the tie-bolts 82 secured in place.

The camshaft bearings 56 are formed in halves for assembly in the mating semi-cylindrical openings 103 (Fig. 4) of the block portions 45, 46 whereby the camshaft structure 52 is rotatably journalled at its journal portions 104.

It will be understood that the bearing block B' may be substituted for block B and what has been said hereinbefore with respect to block B is equally applicable to block B'. The block B' is somewhat more compact as to its intermediate regions 69' than block B such that regions can be more conveniently located closer to the axis of the crank 16 than the corresponding regions 69. Hence it is somewhat easier in some instances to control the swing of the Fig. 12 hinged type of block with respect to the cylinder walls and the movements discussed in connection with Fig. 5. However, the Fig. 10 arrangement is somewhat preferred for assembly and other reasons.

Engines of various desired capacities may be readily made following the teachings of my invention. Engines having cylinder bores larger than that illustrated will naturally develop more total pressure on the piston with consequent increase in size of crankshaft end bearing dimension H. This would have a tendency to limit the available stroke except for the necessary increase in crankshaft bearing diameter which, in turn, accommodates a stroke of substantially half the bore diameter. As fuels of higher octane rating become more available or with supercharged fuel mixture or with diesel cycles, higher compression ratios may be used thus increasing the piston load for a given size cylinder bore and requiring increase in size of crankshaft and dimension H. This will have the tendency to somewhat shorten the available stroke in relation to the bore and increase the ratio of $$\frac{J}{O}$$

hereinbefore set forth. However, such ratio will still in the ultimate not greatly exceed the ratio set forth herein and even in such instances the maximum in compactness may be readily obtained by following the teachings of my invention.

Features of novelty not claimed but disclosed in my subject application are more fully disclosed and claimed in the copending applications of Alexander G. Herreshoff, Serial No. 16,801, filed March 24, 1948, and John P. Butterfield, Serial Nos. 16,646, 16,648, 16,649, 16,650, filed March 24, 1948 and Patent No. 2,571,198.

I claim:

In an engine of the double acting type, in combination; a cylinder block structure having a cylinder bore extending therethrough that is of uniform diameter throughout its length, said cylinder block structure being formed with a pair of crankshaft-receiving bearing openings on opposite sides of said bore that are disposed on an axis perpendicular to the axis of said cylinder bore, a rotatable crankshaft structure having coaxial bearing portions rotatably supported in said block bearing openings and having a crank portion located between and offset from said bearing portions and of such size and shape as to be continuously disposed within said cylinder bore during rotation of the crankshaft, a double ended piston mounted in said cylinder bore for reciprocation lengthwise thereof, said piston having an intermediate body structure connecting the piston end portions that is formed with a first pair of diametrically disposed, axially extending slots arranged so as to receive said crankshaft structure and accommodate reciprocation of the piston relative to said crankshaft bearing portions, said piston intermediate body portion having a second pair of diametrically disposed, axially extending slots spaced approximately ninety degrees circumferentially from said first pair of slots, said piston having an interiorly supported slideway extending transversely of said piston and bore length and aligned with said second pair of slots, a bearing block structure slidably mounted in said slideway and rotatably connected to the crankshaft crank portion for operably connecting said piston and crankshaft structure, said bearing block structure, said slideway, and said crankshaft crank being so constructed and arranged that the slidable bearing surfaces of the bearing block always lie within said cylinder bore during operation of the engine while any other portions of said bearing block that cut the walls of said cylinder bore during crankshaft rotation pass through said second pair of slots in the piston, engine operating mechanism superimposed on said cylinder block and contained in a chamber that extends transversely of the cylinder bore, fluid flow lubrication means for said engine operating mechanism in said chamber, and a pair of conduits formed in said cylinder block and aligned with said second pair of slots in said piston intermediate body structure, one of said conduits connecting said chamber to said second pair of slots in said piston and to said cylinder bore and the other of said pair of conduits connecting said second pair of piston slots and said cylinder bore to a lubricant receiving sump.

JOHN P. BUTTERFIELD.

REFERENCES CITED

The following references are of record in the file of this patent:

UNITED STATES PATENTS

| Number | Name | Date |
| --- | --- | --- |
| 1,042,505 | Twombly | Oct. 29, 1912 |
| 1,047,860 | Twombly | Dec. 17, 1912 |
| 1,140,292 | Sharpneck et al. | May 18, 1915 |
| 1,210,996 | Slate | Jan. 2, 1917 |
| 1,274,813 | Sullivan | Aug. 6, 1918 |
| 1,287,509 | Sullivan | Dec. 10, 1918 |
| 1,287,797 | Tietzmann | Dec. 17, 1918 |
| 1,578,228 | Yearsley | Mar. 23, 1926 |
| 1,735,707 | Worden | Nov. 12, 1929 |
| 2,038,085 | Ross | Apr. 21, 1936 |
| 2,170,099 | Stubings | Aug. 22, 1939 |
| 2,337,157 | Finley et al. | Dec. 21, 1943 |
| 2,404,906 | Heald | July 30, 1946 |

FOREIGN PATENTS

| Number | Country | Date |
| --- | --- | --- |
| 393,606 | France | Oct. 30, 1908 |
| 772,815 | France | Nov. 7, 1934 |